(12) United States Patent
Hiraiwa

(10) Patent No.: US 7,717,246 B2
(45) Date of Patent: *May 18, 2010

(54) SHIFT DEVICE WITH SYNCHRONIZER ADAPTED FOR TRANSMISSION

(75) Inventor: Kazuyoshi Hiraiwa, Yokohama (JP)

(73) Assignee: Kyowa Metal Works Co., Ltd., Yokohama (JP)

( * ) Notice: Subject to any disclaimer, the term of this patent is extended or adjusted under 35 U.S.C. 154(b) by 373 days.

This patent is subject to a terminal disclaimer.

(21) Appl. No.: 11/710,509

(22) Filed: Feb. 26, 2007

(65) Prior Publication Data
US 2007/0199786 A1 Aug. 30, 2007

(30) Foreign Application Priority Data
Feb. 27, 2006 (JP) .............................. 2006-049470

(51) Int. Cl.
*F16D 23/06* (2006.01)
(52) U.S. Cl. .............................. 192/53.31; 192/53.341; 192/48.91
(58) Field of Classification Search ............ 192/53.341, 192/53.31, 53.343

See application file for complete search history.

(56) References Cited

U.S. PATENT DOCUMENTS

| 3,548,983 | A | | 12/1970 | Hiraiwa | |
|---|---|---|---|---|---|
| 4,674,614 | A | * | 6/1987 | Ikemoto et al. | 192/53.34 |
| 6,443,281 | B2 | * | 9/2002 | Jackson et al. | 192/53.31 |
| 7,131,521 | B2 | * | 11/2006 | Coxon et al. | 192/53.31 |
| 2004/0154892 | A1 | * | 8/2004 | Coxon et al. | 192/53.31 |

FOREIGN PATENT DOCUMENTS
JP 45-35684 11/1970

* cited by examiner

*Primary Examiner*—David D Le
*Assistant Examiner*—Ryan Dodd
(74) *Attorney, Agent, or Firm*—Wenderoth, Lind & Ponack L.L.P.

(57) ABSTRACT

A shift device includes a hub, a sleeve splined with the hub, a pair of speed gears located at both sides of the hub, and a pair of synchronizer rings arranged between the hub and the speed gears. Thrust pieces are respectively engageable with projections of the sleeve and movable in notch portions of the hub in an axial direction the shift device. The thrust pieces are formed with first slanted surfaces pressable on chamfers of the synchronizer rings and second slanted surfaces contactable with slanted surfaces of the hub. The thrust pieces engage and move together with the sleeve in the axial direction when the first slanted surfaces press the chamfers of the synchronizer ring and are disengaged from the sleeve before the splines of the sleeve and the speed gear are engaged.

11 Claims, 15 Drawing Sheets

SHIFT DEVICE WITH SYNCHRONIZER ADAPTED FOR TRANSMISSION

BACKGROUND OF THE INVENTION

1. Field of the Invention

The present invention relates to a shift device with a synchronizer adapted for a transmission in which pushing force applied to a sleeve can be amplified into a larger pushing force acting on a synchronizer ring while gears of the transmission are shifted, thereby reducing operating force required by a driver or an actuator.

2. Description of the Related Art

A shift device with a synchronizer adapted for a transmission of this kind is disclosed in Japanese Examined Patent Application Publication No. 45-35684. This conventional shift device includes a hub and a sleeve, where the sleeve is formed with a slanted surface so that the slanted surface thereof can change a part of friction torque caused between the sleeve and the hub into thrust acting on the synchronizer ring, thereby increasing synchronizing ability. It may add a thrust plate which has slanted surfaces and is arranged between the sleeve and the hub.

This conventional shift device with the synchronizer, however, encounters the following problems.

The slant surface of the hub needs to be formed on the vicinity of a central portion in an axial direction thereof, which requires a difficult manufacturing process for forming the slant surface on the hub, consequently increasing its manufacturing costs.

SUMMARY OF THE INVENTION

It is, therefore, an object of the present invention to provide a shift device with a synchronizer adapted for a transmission which overcomes the foregoing drawbacks and can decrease manufacturing costs of a hub, keeping high synchronizing ability due to self-servo operation.

According to a first aspect of the present invention there is provided a shift device with a synchronizer which is adapted for a transmission and includes a shaft for transmitting drive power, a hub, a sleeve, a pair of speed gears, a pair of synchronizer rings and thrust pieces. The hub has a boss portion splined with the shaft, a ring portion located outwardly away from the boss portion and formed on an outer peripheral surface thereof with splines, and a flange portion connecting the boss portion and the ring portion, the ring portion and the flange portion being formed with a plurality of notch portions having axial four edges, and the axial four edges being respectively provided with slanted surfaces for changing rotational force to thrust. The sleeve is provided with splines on an inner peripheral surface thereof and is formed with projections on a part of the splines of the sleeve, the sleeve being supported by and slidable along the spline of the hub. The pair of speed gears is arranged to sandwich the hub, and the gears have splines which are engageable with the splines of the sleeve, and a friction surface at a hub side. The pair of synchronizer rings is respectively arranged between the hub and the speed gears, each having a friction surface and chamfers on an outer circumference thereof, and the friction surfaces are respectively pressable on the friction surfaces of the speed gears. The thrust pieces are movable in the notch portions of the hub in an axial direction the shift device, and they are formed with first slanted surfaces pressable on the chamfers of the synchronizer rings and second slanted surfaces contactable with the slanted surfaces of the hub so that the thrust pieces can change rotational force due to friction torque generated between the friction surfaces to thrust. The thrust pieces engage and move together with the sleeve in the axial direction when the sleeve is moved toward the gear to be engaged and the first slanted surfaces of the thrust pieces press the chamfers of the synchronizer ring and the thrust pieces are disengaged from the sleeve when the friction torque becomes zero and the splines of the sleeve are engaged with the splines of the speed gear.

Preferably, the synchronizer rings are provided with projections on outer peripheral surfaces thereof, and the thrust pieces are formed like a rectangular shape, seen from an outside of the hub in a radial direction, and provided with projections at four corners thereof, recess portions engageable with the projections of the sleeve on an outer peripheral surfaces thereof, and recesses for receiving the projections of the synchronizer rings at both end portions in the axial direction on an inner peripheral surfaces thereof. The inner peripheral surfaces of the thrust pieces contact with the projections of the synchronizer ring when the first slanted surfaces of the thrust pieces press the chamfers of the synchronizer ring, and are disengaged from the sleeve, receiving the projections of the synchronizer ring in the recess of the thrust pieces before the splines of the sleeve are engaged with the splines of the speed gear.

Preferably, the second slanted surfaces of the thrust pieces are in a contact-free relationship with the slanted surfaces of the hub when the sleeve is placed at a neutral position, and only the second slanted surfaces at the to-be-engaged-with speed gear side are contactable with the slanted surfaces of the hub when the sleeve is moved toward the to-be-engaged-with speed gear.

Preferably, the thrust pieces are pushed outwardly in the radial direction by a spring.

Preferably, the sleeve has projecting portions at central portions of a part of the splines thereof, and the projecting portions of the sleeve are contactable with the first slanted surfaces of the thrust pieces when the splines of the sleeve are engaged with the splines of the speed gear.

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE INVENTION

Figure 1:
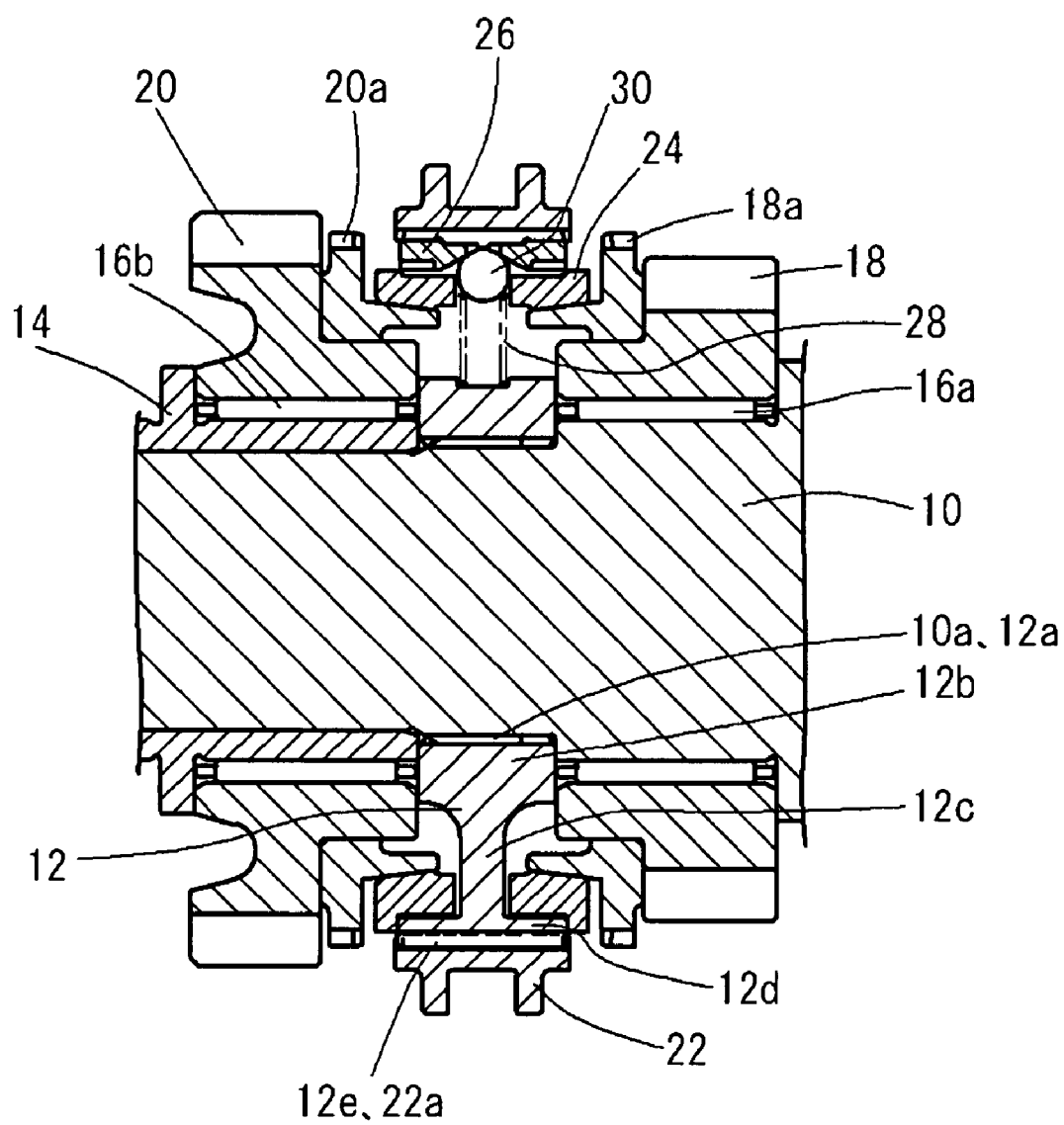
FIG. 1 is a cross-sectional plan view, taken along the line Z-Z in FIG. 2, showing a shift device with synchronizers of a first embodiment according to the present invention, the shift device being used for third speed and fourth speed.

Throughout the following detailed description, similar reference characters and numbers refer to similar elements in all figures of the drawings, and their descriptions are omitted for eliminating duplication.

Figure 2:
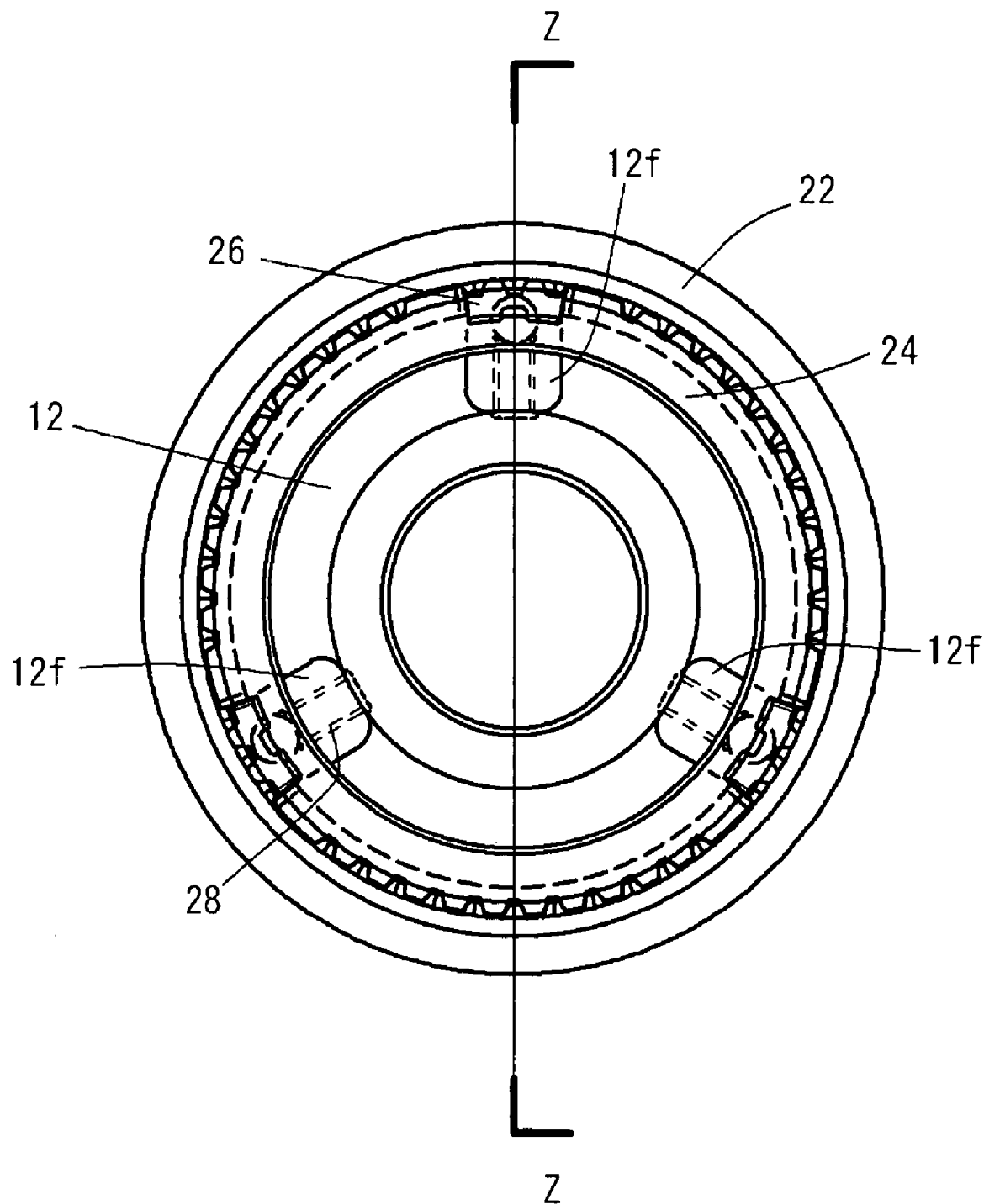
FIG. 2 is a front view showing a hub, a sleeve, a synchronizer ring and three thrust pieces pushed by a spring outwardly in a radial direction of the shift device, which are used in the shift device of the embodiment shown in FIG. 1.
Figure 3:
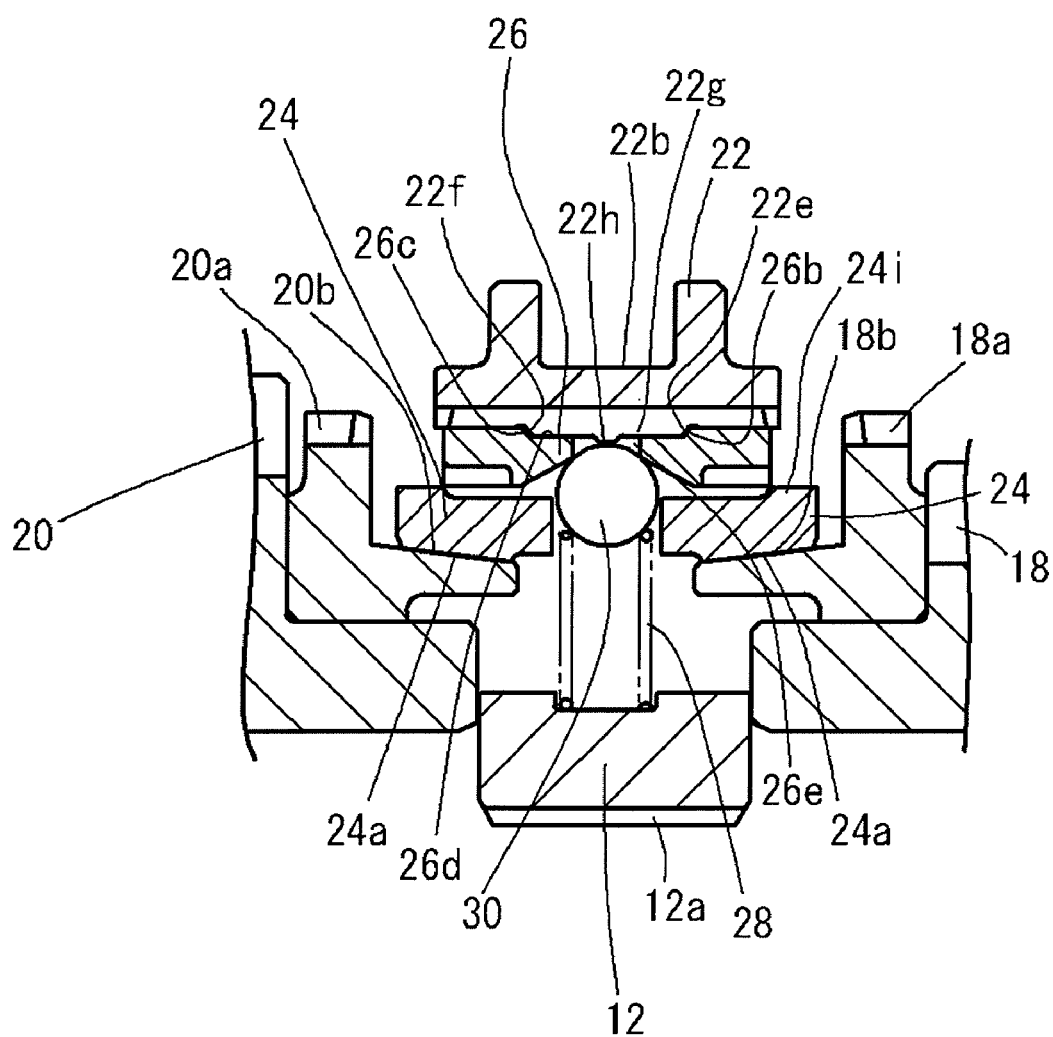
FIG. 3 is an enlarged cross-sectional plan view showing a main part of the shift device shown in FIG. 1.

Referring to FIGS. 1 to 3 of the drawings, there is shown a shift device, which has a synchronizer and is adapted for a transmission of a motor vehicle, of a first preferred embodiment according to the present invention.

The shift device includes an input shaft 10 connectable with a not-shown crank shaft of an engine via a not-shown clutch, a third gear 18, a fourth gear 20, and a synchronizer 2 placed between the third gear 18 and the fourth gear 20. The input shaft 10 is capable of transmitting drive power and acts as a shaft of the present invention. The third gear 18 and the fourth gear 20 act as a pair of speed gears of the present invention.

The input shaft 10 is formed on its partial outer surface with splines 10a, which is engaged by splines 12a formed on an inner surface of cylindrical boss portion 12b of a hub 12, so that the input shaft 10 drives the hub 12 to rotate together with each other at the same speed. The hub 12 is fixed to the input shaft 10 by contacting at its one side portion with a large diameter portion of the input shaft 10 and also contacting at its other end portion with a bush 14, which is press-fitted onto an outer surface of a small diameter portion of the input shaft 10.

The hub 12 has the boss portion 12b, a ring portion 12d arranged in coaxial with the boss portion 12b and outwardly in its radial direction, and a flange portion 12c connecting the boss portion 12b and the ring portion 12d and formed thinner in thickness than the boss portion 12b. Splines 12e are formed on the outer surface of the ring portion 12d and engage with splines 22a formed on an inner surface of a sleeve 22 so as to slide relative to each other in the axial direction.

The sleeve 22 is formed with a circumferential groove 22b on its outer surface, in which a not-shown shift fork is partially inserted. The shift fork is capable of moving in the axial direction according to a not-shown shift lever operated by a driver or a not-shown actuator.

On the input shaft 10, the third gear 18 is freely rotatably supported through a bearing 16a at one side of the hub 12, and the fourth gear 20 is freely rotatably supported though a bearing 16b at the other side of the hub 12. The third gear 18 and the fourth gear 20 are in constant mesh with not-shown gears on an output shaft arranged in parallel to the input shaft 10, respectively.

As shown in FIG. 3, the third gear 18 is formed to integrally have splines 18a and an outer conical friction surface 18b at the hub 12 side thereof. The splines 18a are capable of engaging with the spline 22a of the sleeve 22 by moving the sleeve 22 to a third speed position. The outer conical friction surface 18b faces to an inner conical friction surface 24a of a synchronizer ring 24. The inner conical friction surface 24a corresponds to a friction surface of the present invention.

Similarly, the fourth gear 20 is formed to integrally have splines 20a and an outer conical friction surface 20b at the hub 12 side thereof. The splines 20a are capable of engaging with the spline 22a of the sleeve 22 by moving the sleeve 22 to a fourth speed position. The outer conical friction surface 18b faces to an inner conical friction surface 24a of another synchronizer ring 24, which is arranged in symmetric with the synchronizer ring 24 at the third gear 18 side. The inner conical friction surface 24a corresponds to a friction surface of the present invention.

The sleeve 22 is designed to have lengths and positional relationships with other parts so as to move to be shiftable among the third speed position, the fourth speed position, and a neutral position. The neutral position is between the third and fourth speed positions as shown in FIGS. 1 and 3, where the splines 22a of the sleeve 22 are not in mesh with the splines 18a and 20a of the third and fourth gears 18 and 20. Note that the splines 22a of the sleeve 22 are in constant mesh with the splines 12e of the ring portion 12d at the third speed, neutral and fourth speed positions.

The synchronizer ring 24, the sleeve 22 and the splines 18a and 20a and the outer friction surfaces 18b and 20b of the third and fourth gears 18 and 20 constitute the synchronizer of the shift device.

The above-constructed synchronizer 2 of the embodiment further has a force amplifying mechanism, which is constructed as below.

Figure 4:
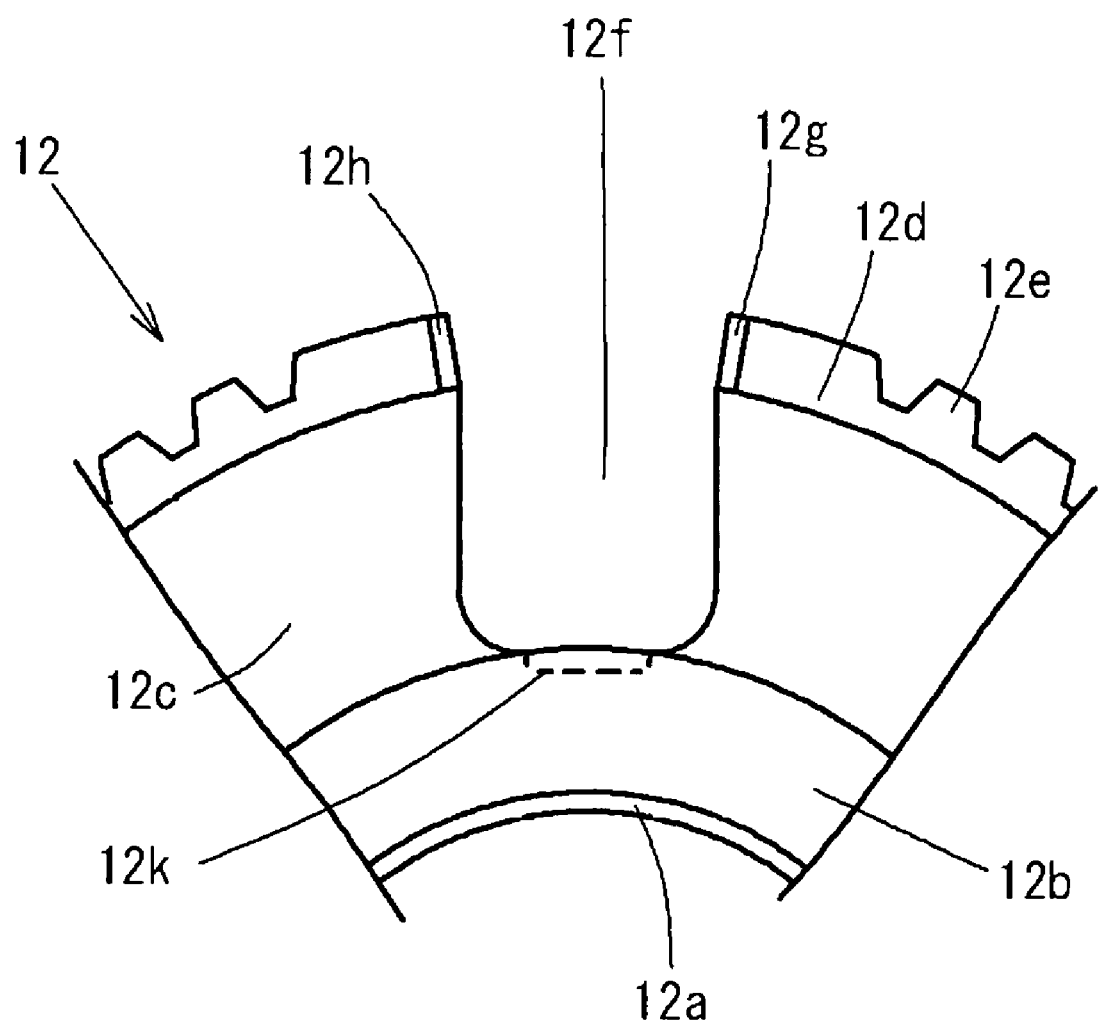
FIG. 4 is an enlarged fragmentary front view showing the hub of the shift device shown in FIG. 1.

As shown in FIG. 4, the flange portion 12c and the ring portion 12d of the hub 12 are partially cut off at three portions to form three notch portions 12f, in each of which a thrust piece 26 is located as shown in FIGS. 1 to 3. The thrust pieces 26 are also located between the synchronizer rings 24 and 24 in the axial direction, and between the hub 12 and the sleeve 22 in the radial direction. The thrust pieces 26 are pushed outwardly in a radial direction by three springs 28, which are arranged in an inner space formed by the three thrust pieces 26.

Figure 5:
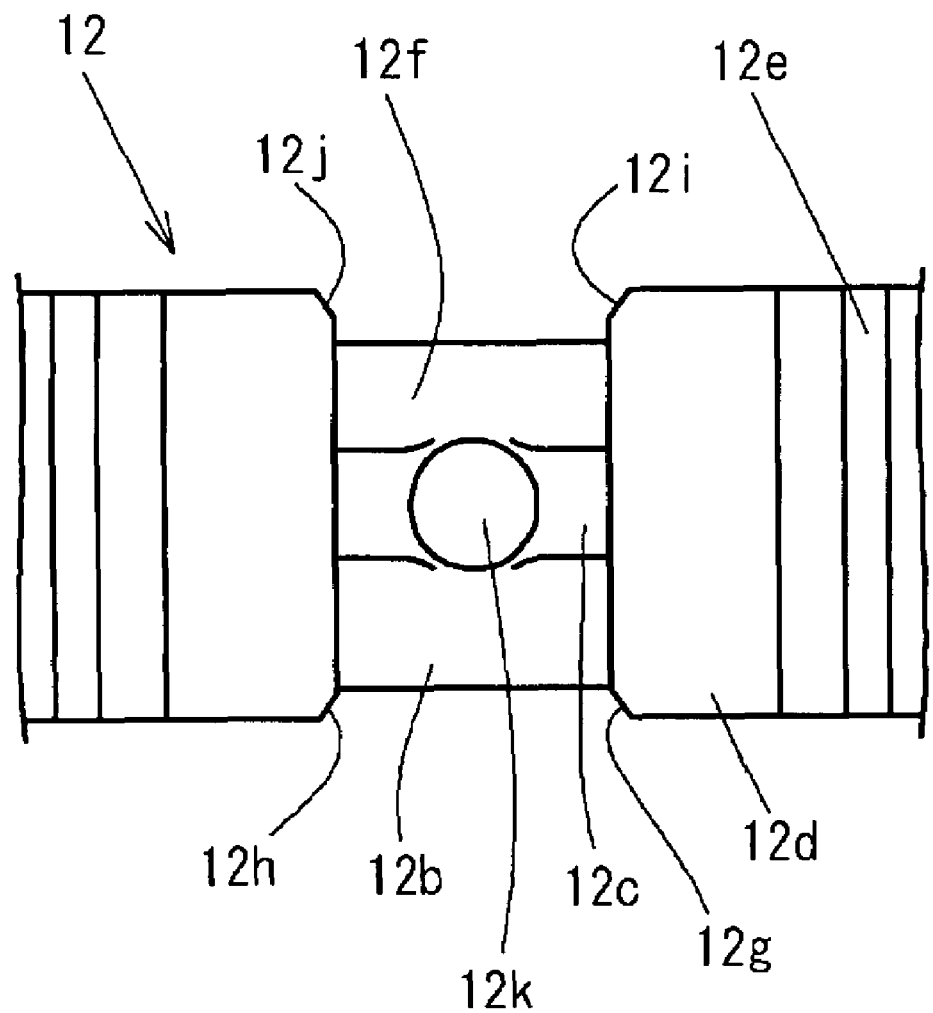
FIG. 5 is a development-elevated fragmentary view showing an outer peripheral part of the hub shown in FIG. 4, seen from the outside of the hub in the radial direction.

The notch portions 12f of the hub 12 are formed at four edges in the axial direction to have slanted surfaces 12g to 12j as shown in FIG. 5. These slanted surfaces 12g to 12j are designed to have a configuration to change directions of forces so that the thrust pieces 26 are pressed in the direction when the thrust pieces 26 contact with the slanted surfaces 12g to 12j of the hub 12 and rotating force is applied to the thrust pieces 26. The notch portions 12f are also formed at the boss portion 12b side with a seat surface 12k for receiving the spring 28.

Figure 6:
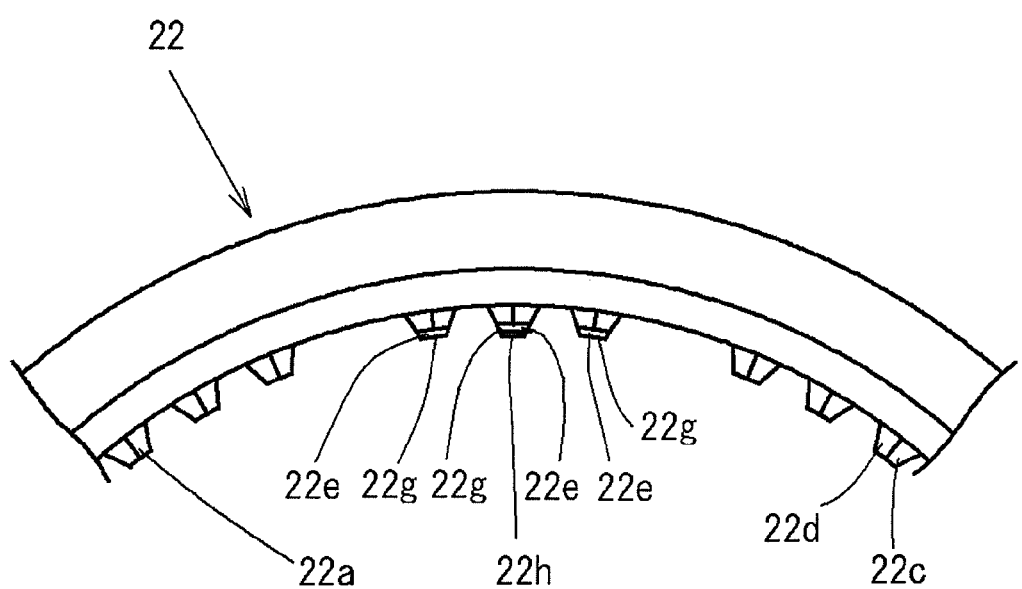
FIG. 6 is an enlarged fragmentary front view showing the sleeve used in the select device shown in FIG. 1.
Figure 7:
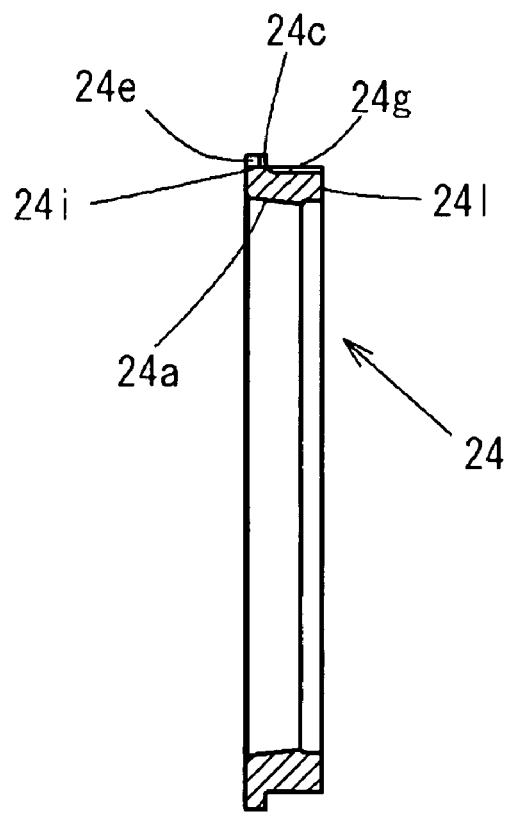
FIG. 7 is a cross-sectional view, taken along the line Z-Z in FIG. 2, showing the synchronizing ring.
Figure 8:
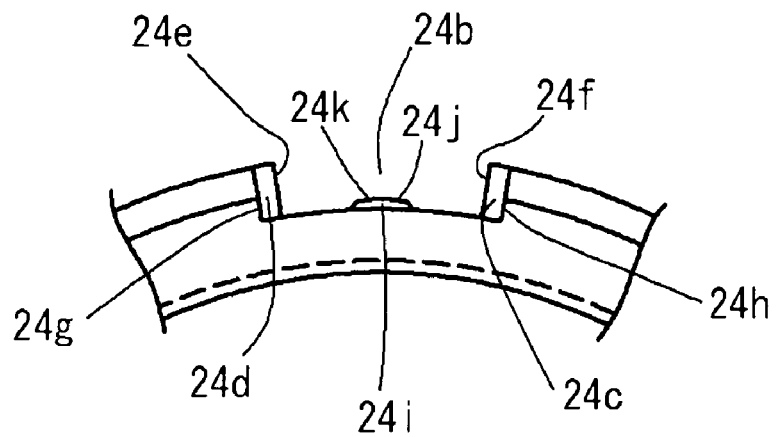
FIG. 8 is an enlarged fragmentary front view showing the synchronizer ring.
Figure 9:
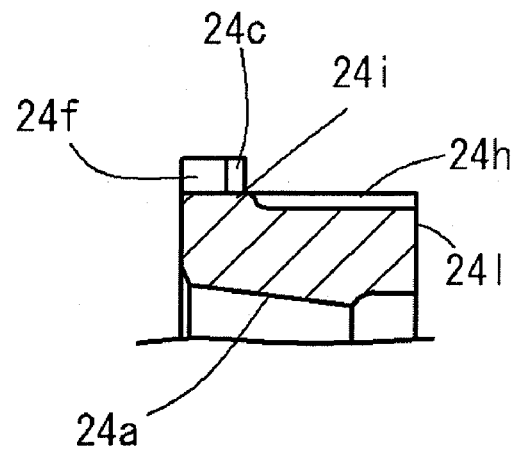
FIG. 9 is an enlarged fragmentary cross-sectional view of the synchronizer ring shown in FIGS. 7 and 8.
Figure 10:
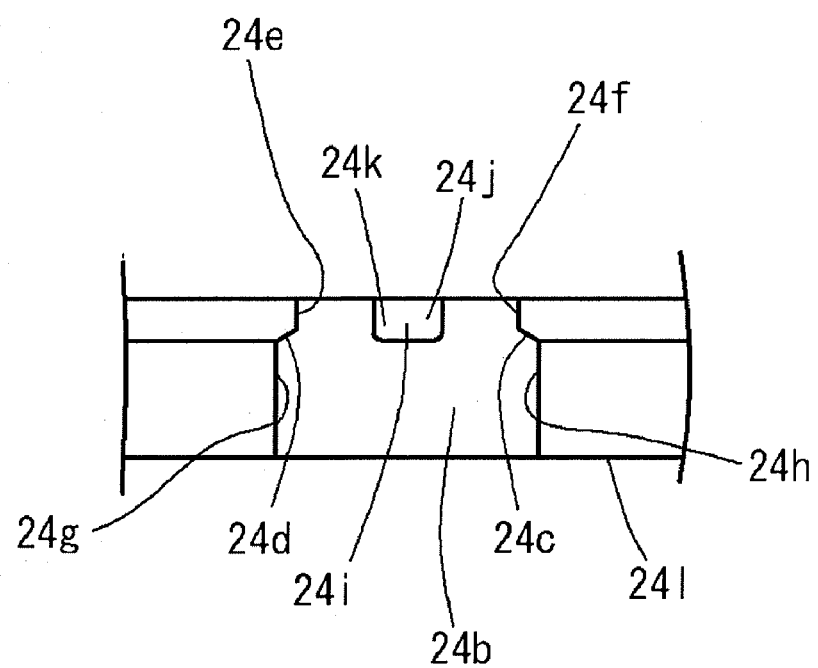
FIG. 10 is a development-elevated view showing the synchronizer ring, seen from the outside of the hub in the radial direction.

As shown in FIG. 6, the splines 22a of the sleeve 22 are formed to have chamfers 22c and 22d at their axial both ends, three splines at three positions around a circumstance of the splines 22a of the sleeve 22 are formed inside thereof with projections 22g respectively having slanted surfaces 22e and 22f at both axial end portions of projections 22g. The projections 22g are engageable with the thrust piece 26. One spline, namely an intermediate one, of the three splines is has a projecting portion 22h at its axial central portion. The projections 22g are shorter in axial length than the splines, and the projecting portion 22h is shorter in the axial length than the projections 22g as shown in FIG. 3.

As shown in FIGS. 7 to 10, each synchronizer ring 24 is formed on its inner peripheral surface with a conical friction surface 24a. The conical friction surfaces 24a of the synchronizer rings 24 are arranged so as to face the friction surfaces 18b and 20b of the third and fourth speed gears, respectively.

The synchronizer rings 24 are also formed on its outer peripheral surface with three notch portions 24b, each of which has first end surfaces 24e and 24f, second end surfaces 24g and 24h and chamfers 24c and 24d connecting the first and second end surfaces 24e and 24g, 24f and 24h, respectively. At an intermediate and speed-gear side position in the notch portion 24b, a projection 24i is formed to have slanted surfaces 24j and 24k. The synchronizer ring 24 has a rear surface 24l at its hub 12 side.

Figure 11:
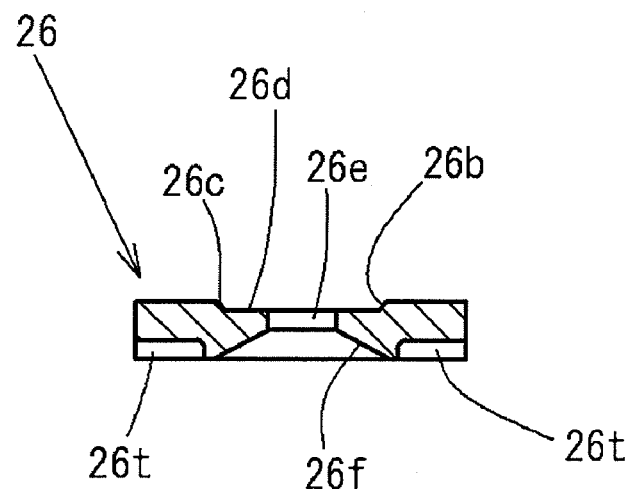
FIG. 11 is an enlarged cross-sectional view showing a thrust piece used in the shift device shown in FIGS. 1 and 2.
Figure 12:
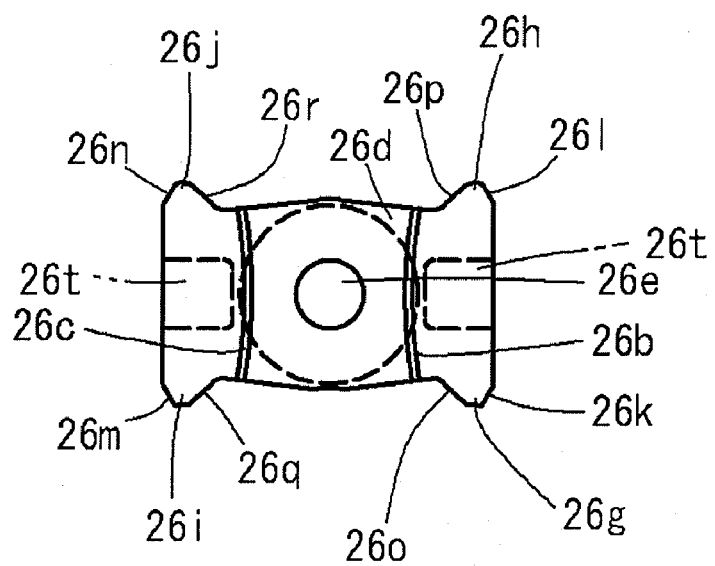
FIG. 12 is a development-elevated view showing the thrust piece shown in FIG. 11, seen from the outside of the hub in the radial direction.
Figure 13:
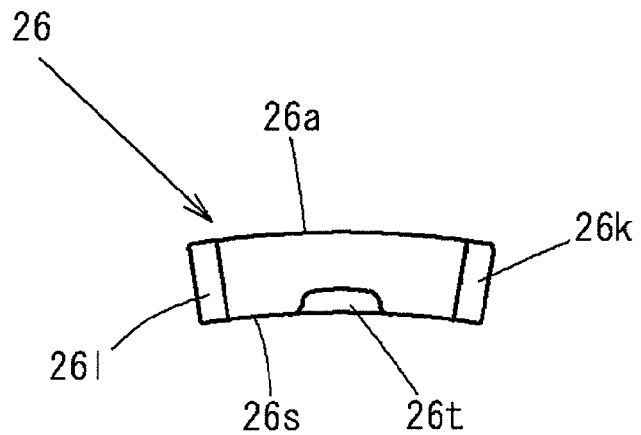
FIG. 13 is a front view showing the thrust piece shown in FIGS. 11 and 12.

As shown in FIGS. 11 to 13, the thrust pieces 26 are formed on its outer peripheral surfaces with a recess portion 26d having engageable slanted surfaces 26b and 26c, where a through-hole 26e at the center of the recess portion 26d is provided to connect with conical hole portion 26f. The conical hole portion 26f receives a ball 30 pressed by the spring 28.

The recess portion 26d corresponds to the projection 22g of the sleeve 22, and is designed so that the projecting portion 22h of the sleeve 22 can be received in the through-hole 26e of the thrust pieces 26 when the thrust piece 26 is engaged with the projection 22g as shown in FIGS. 1 to 3.

The thrust pieces 26 are formed to have an entirely curved portion as shown in FIG. 13, and are preferably formed as a part of a spherical shape. They have shapes like a rectangle, seen from an upper side (from an outer side in the radial direction), having four projections 26g to 26j at its corners. The projections 26g to 26j are formed with first slanted surfaces 26k to 26n at the outer side in the axial direction and with second slanted surfaces 26o to 26r at the inner side in the axial direction, respectively. The first slanted surfaces 26k to 26n correspond to the chamfers 24c and 24d of the synchronizer ring 24, and the second slanted surfaces 26o to 26r correspond to the slanted surfaces 12g to 12j, respectively, so that the corresponding surfaces thereof are contactable with each other.

The thrust piece 26 is slightly swingable with respect to the hub 12, and accordingly the first slanted surfaces 26k to 26n and the second slanted surfaces 26o to 26r are formed to have a slightly circular arc surface with small rounded corners.

As shown in FIGS. 11 and 13, two recesses 26t are provided at both axial end portions on an inner peripheral surface 26s of the thrust piece 26, so as to correspond to the projection 24i of the synchronizer ring 24. Specifically, the projection 24i of the synchronizer ring 24 is received in one of the recesses 26t when the thrust piece 26 is moved inwardly in the radial direction.

The operation of the shift device of the embodiment will be described with reference to the drawings of FIGS. 3, 14 to 18.

Note that the drawings of FIGS. 14 to 17 are development elevations for easy understanding.

Figure 14:
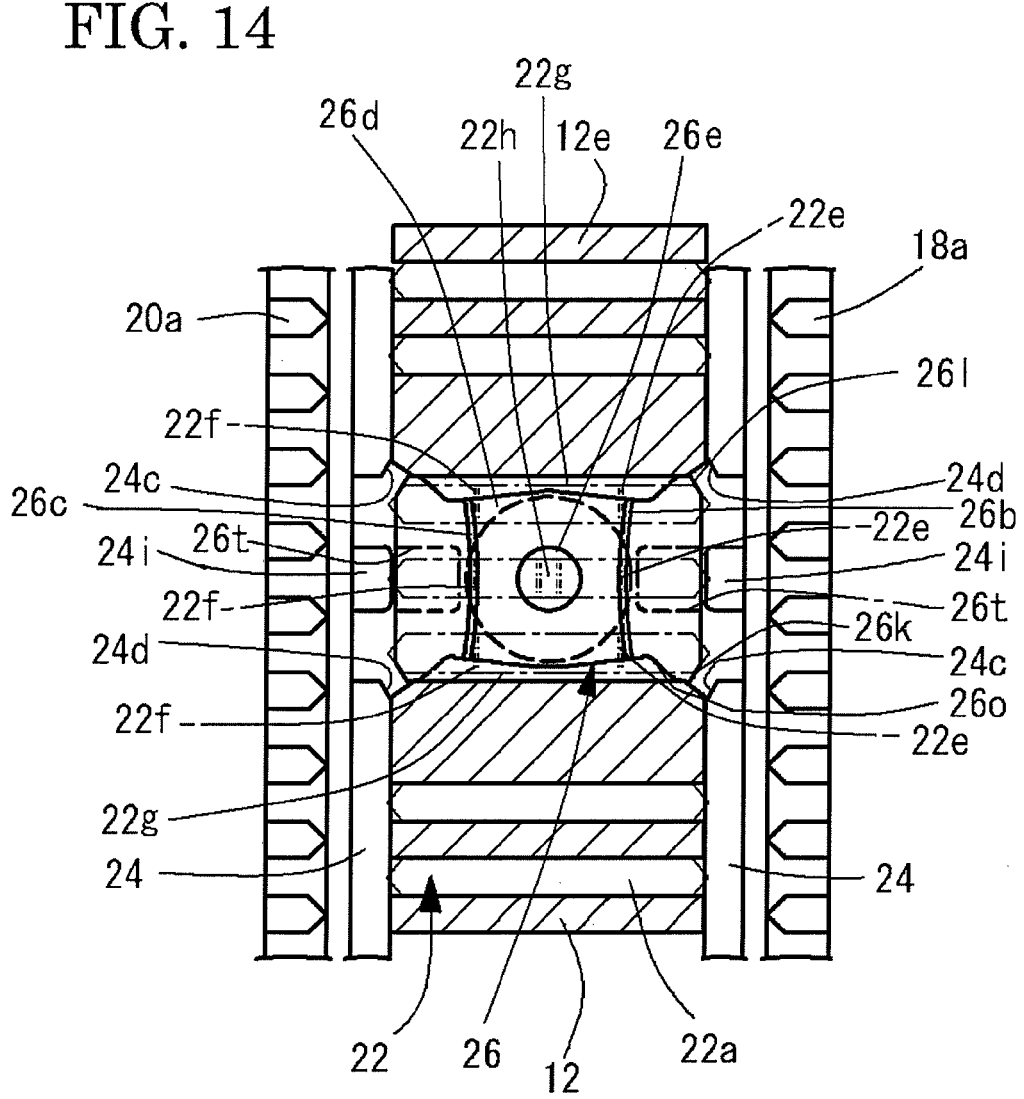
FIG. 14 is a development elevation showing a state of the shift device when it is kept at a neutral position.
Figure 15:
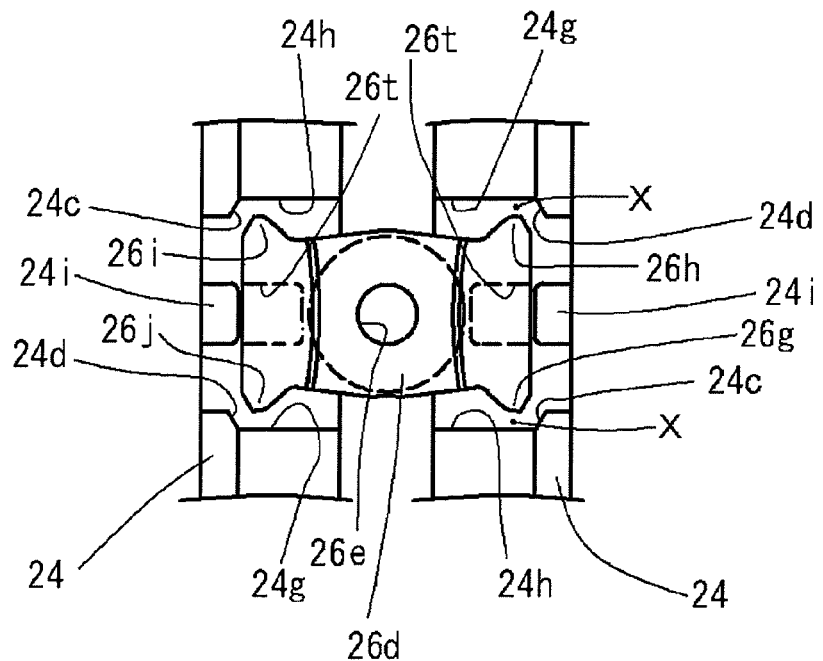
FIG. 15 is a development elevation showing a position relationship between the thrust piece and the synchronizer rings sandwiching the thrust piece.

At the neutral position, the sleeve 22 is positioned at a position shown in FIGS. 3 and 14, so that its splines 22a engage only with the splines 12e of the hub 12, not with the splines 24b of the synchronizer rings 24. In this position, the thrust pieces 26 are pushed outwardly in the radial direction by the springs 28, so that the thrust pieces 26 are engaged with the projections 22g of the sleeve 22 and the cut-off portions 12f of the hub 12. At this neutral position, the second slanted surfaces 26o to 26r of the thrust pieces 26 are not in contact with the slanted surfaces 12g to 12j of the hub 12.

In order to obtain third speed, the sleeve 22 is moved toward the third gear 18. The sleeve 22 and the thrust pieces 26, engaged with the sleeve 22, move together, so that, first, the ball 30 contacts with the rear surface 24l of the synchronizer ring 24, pressing the synchronizer ring 24 toward the third gear 28 with force corresponding to tension of the springs 30. In this state, when there is a rotational speed difference between the input shaft 10 and the third gear 18, friction is generated between the friction surface 24a of the synchronizer ring 24 and the friction surface 18b of the third gear 18. The frictional torque generated therebetween rotates the synchronizer ring 24 with respect to the thrust pieces 26, thereby changing its state into a state shown in FIG. 16. In this state, the chamfers 24d of the synchronizer ring 24 contact with the first slanted surface 26l of the thrust pieces 26.

Figure 16:
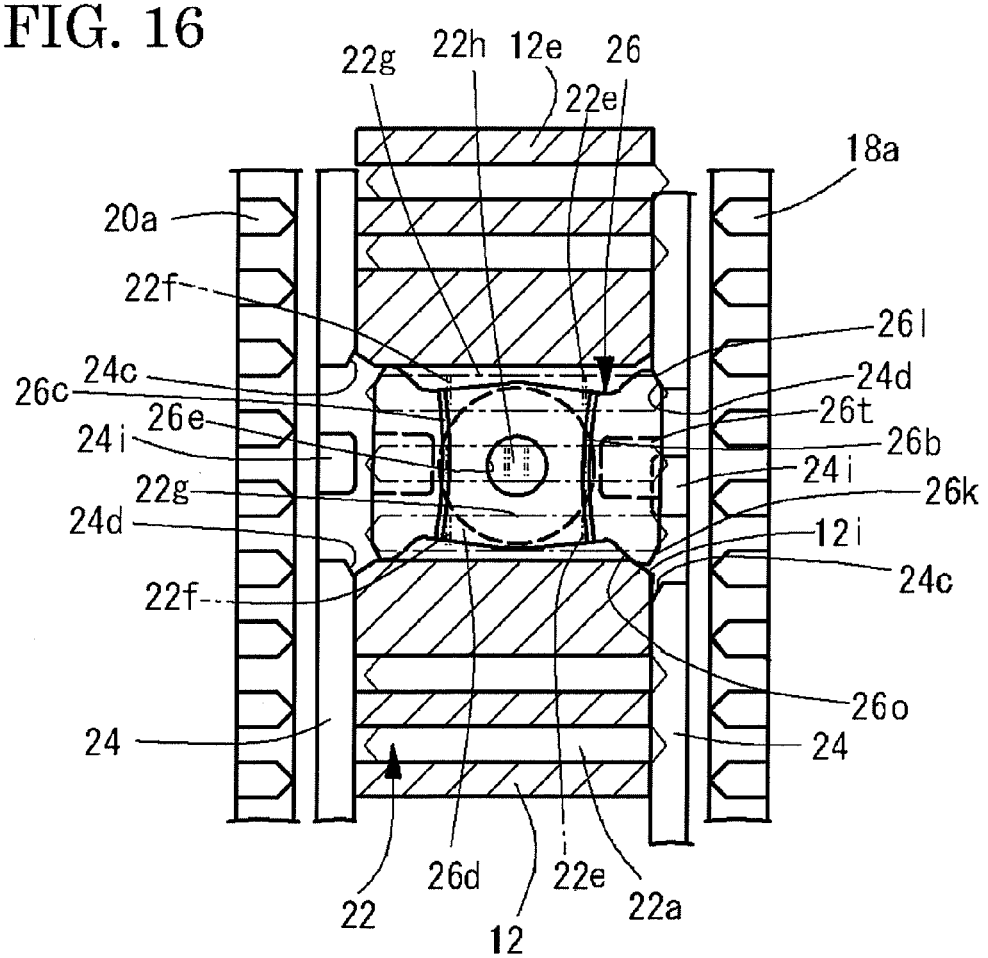
FIG. 16 is a development elevation showing a state of the shift device when the sleeve is moved toward the third gear and a first slant surface of the thrust piece, pressed by a chamfer surface of the synchronizer ring, contacts with a slant surface of the hub.

Specifically, the thrust pieces 26 are slightly moved toward the third gear 18, so that they are swingable in the notch portions 12f of the hub 12. Consequently, the thrust pieces 26 are pressed by the chamfers 24d of the synchronizer ring 24 to be slightly swung in a clockwise direction as shown in FIG. 16, and the second slanted surfaces 26o of the thrust pieces 26 contact with the slanted surfaces 12i of the hub 12. The projections 24i are somewhat out of the recesses 26t of the thrust pieces 26 as shown in FIG. 16. This causes the inner peripheral surfaces 26s of the thrust pieces 26 to contact with the slanted surfaces 24j of the projections 24i of the synchronizer ring 24, and accordingly the thrust pieces 26 can not move inwardly in the radial direction from a state shown in FIG. 17 corresponding to the state of FIG. 16. This maintains a state where the slanted surfaces 22e of the sleeve 22 and the engageable slanted surfaces 26b of the thrust pieces 26, so that the sleeve 22 keeps pressing the thrust pieces 26 in the axial direction.

On the other hand, the second slanted surfaces 26o of the thrust pieces 26 contact with the slanted surfaces 12i of the hub 12, and accordingly the friction torque transmitted through the chamfers 24c of the synchronizer ring 24 acts on the hub 12 through the thrust pieces 26. The second slanted surfaces 26o and the slanted surfaces 12i are capable of changing rotational force due to friction torque to thrust, when the friction torque generated by the rotational speed difference between the synchronizer ring 24 and the third gear 18 acts on the slanted surfaces 26o and 24d. Thus the thrust pieces 26 are pressed toward the third gear 18.

Figure 17:
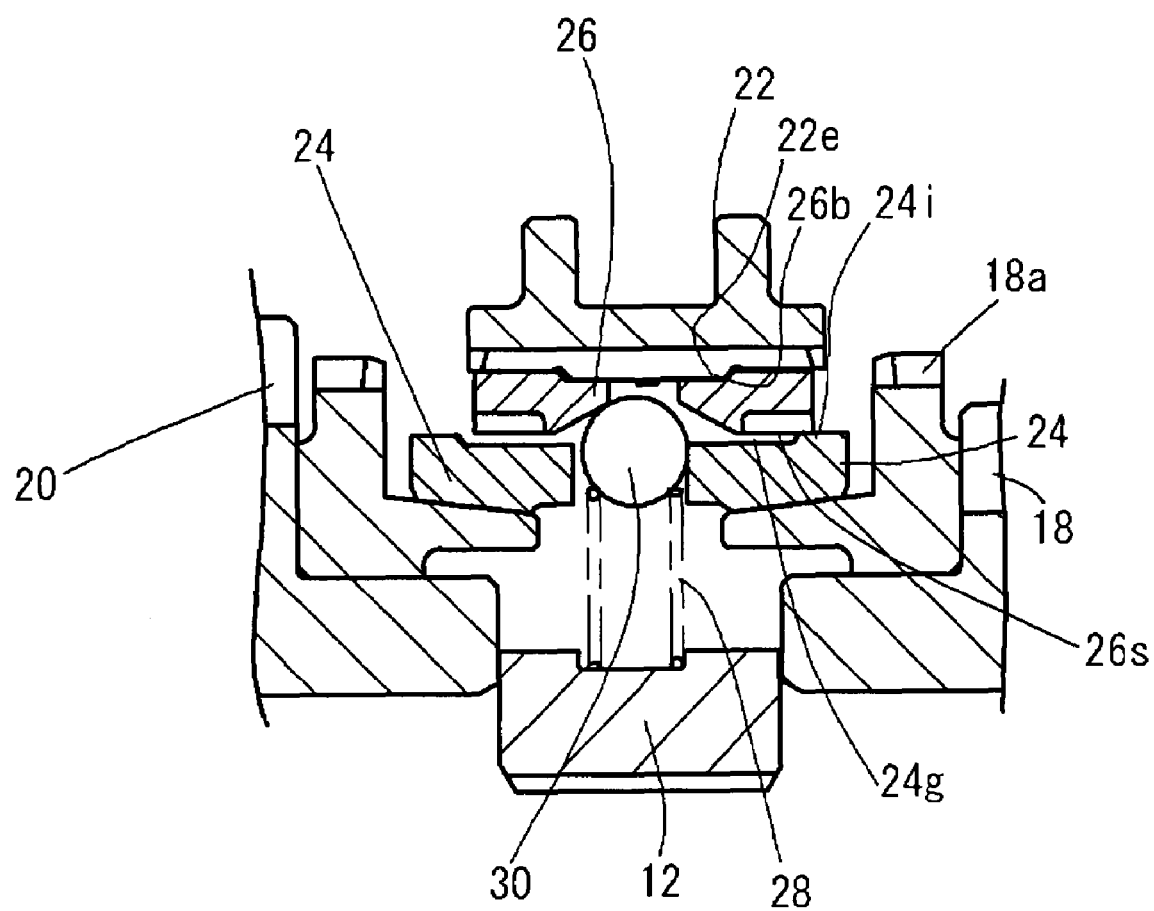
FIG. 17 is a cross-sectional plan view showing the state of the shift device shown in FIG. 16.

That is, when the friction torque Tf is generated in the state shown in FIGS. 16 and 17, the thrust pieces 26 applies axial resultant force Fm+Ft on the chamfers 24c of the synchronizer ring 24, where Fm is thrust pressed by the slanted surfaces 22e of the sleeve 22 and Ft is thrust generated by the first slanted surfaces 26k of the thrust pieces 26 and the slanted surfaces 12g of the hub 12. The thrust Ft acts as self-servo force generated by the friction torque, and is added to the thrust Fm to press the synchronizer ring 24. This can reduce operating force by an amount of the thrust Fm than that of a shift device without a self-servo function.

Angles of the chamfers 24c and 24d of the synchronizer ring 24 are set properly so that the thrust pieces 26 can be prevented from moving forward in the axial direction by the synchronizer ring 24 as long as the rotational speed difference is generated between the synchronizer ring 24 and the third gear 18. Therefore, the thrust pieces 26 cannot move to the splines 18a of the third gear 18, and keep pressing the synchronizer ring 24 to function the self-servo operation, adding the self-servo thrust Fm.

This self-servo operation gradually decreases the rotational speed difference between the synchronizer ring 24 and the third gear 18 into substantially zero, namely diminishing the friction torque into substantially zero. The thrust pieces 26 rotate the synchronizer ring 24 relatively thereto toward its neutral position by the first slanted surfaces 26l, thereby being allowed to move forward toward the third gear 18.

Figure 18:
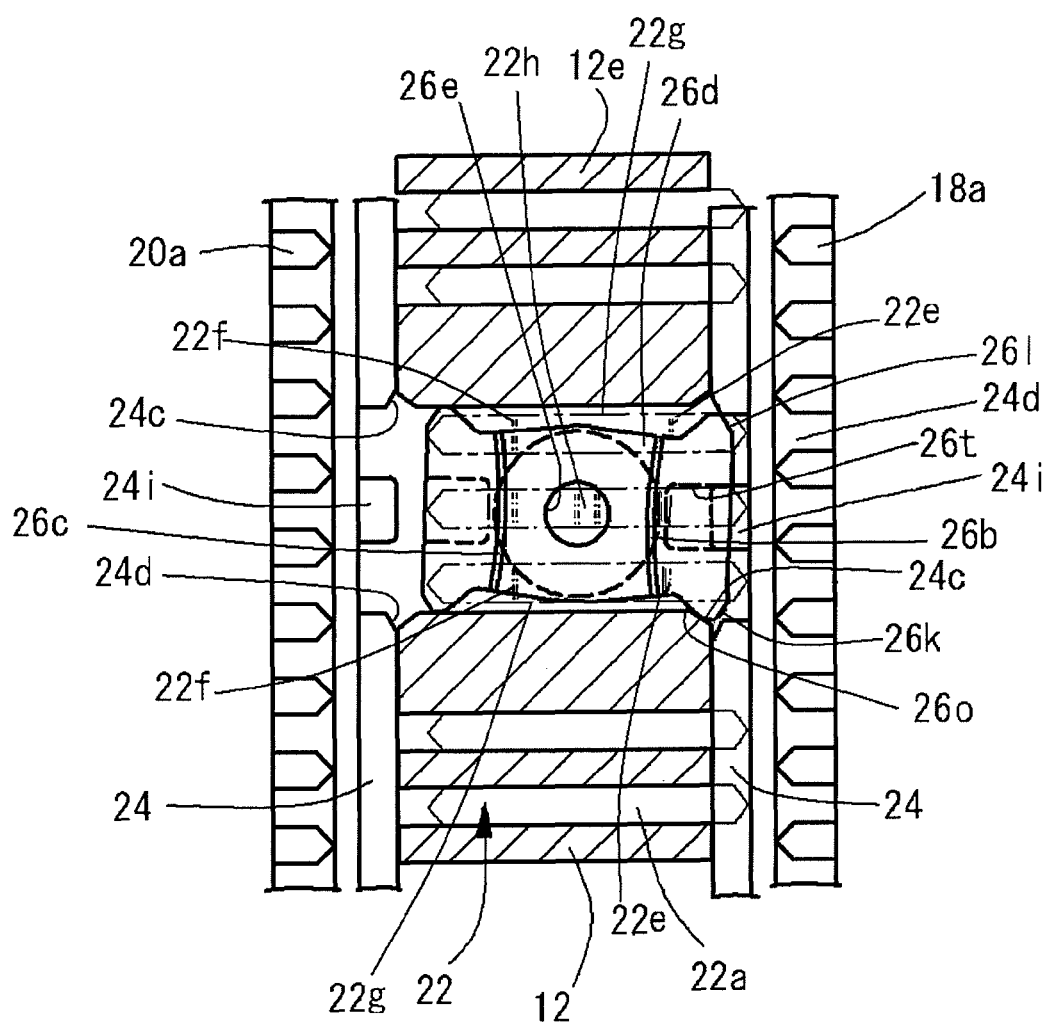
FIG. 18 is a development elevation showing a state of the shift device when the sleeve is further moved toward the third gear and the first surface of the thrust piece moves over the chamfer surface of the synchronizer ring.
Figure 19:
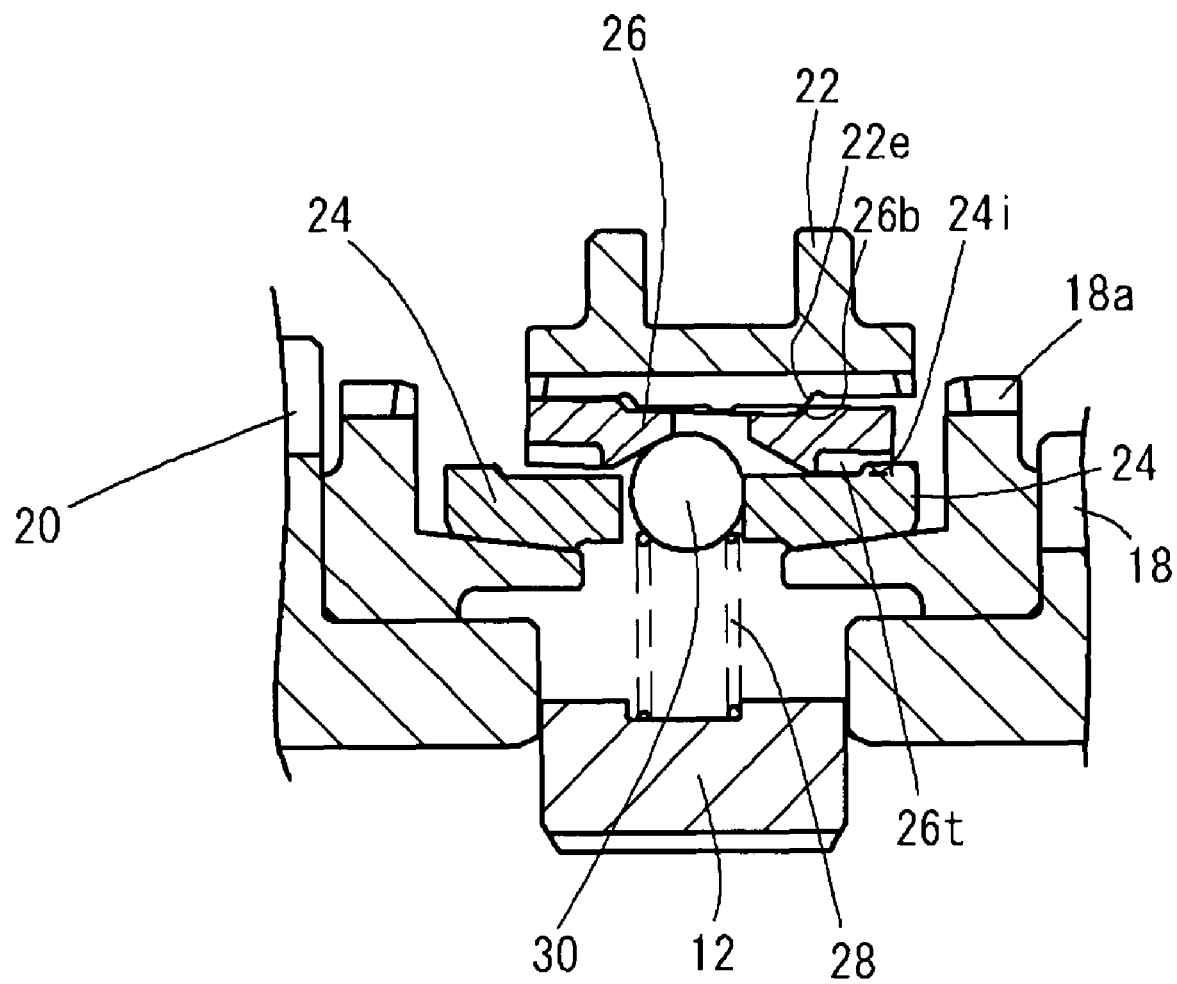
FIG. 19 is a cross-sectional view showing the state of the shift device shown in FIG. 8.

Then the first slanted surfaces 26l of the thrust pieces 26 move over the chamfers 24d of the synchronizer ring 24, and the projections 24i of the synchronizer ring 24 are received in the recesses 26t of the thrust pieces 26 as shown in FIGS. 18 and 19. In this state, a third-gear side portions of the thrust pieces 26 are moved inwardly in the radial direction, and the projections 22g of the sleeve 22 and the recess portions 26d of the thrust pieces 26 are disengaged from each other as shown in FIG. 19, which enables the sleeve 22 to move toward the third gear 18.

Figure 20:
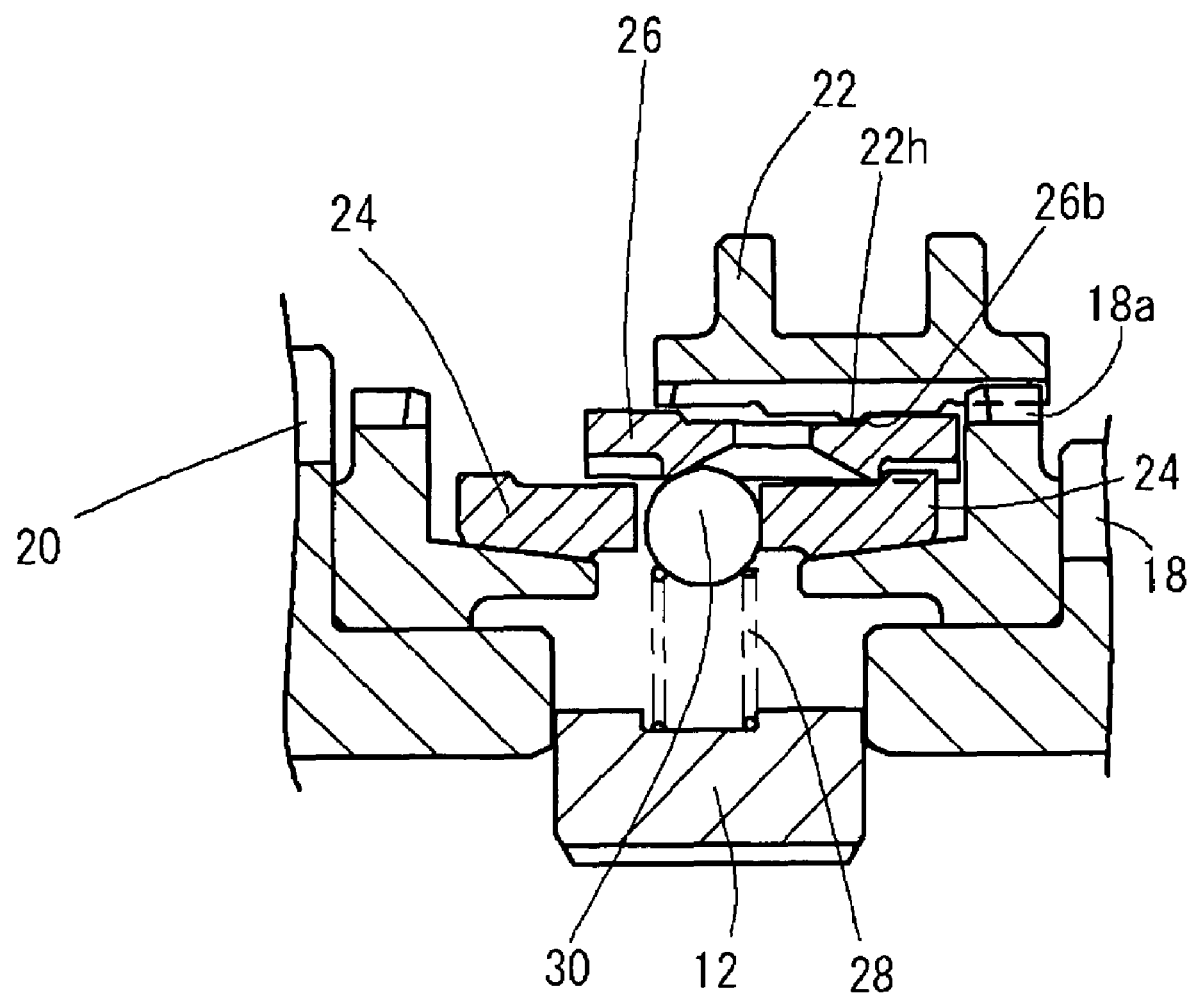
FIG. 20 is a cross-sectional plan view showing the main part of the shift device when the gear shifting toward the third speed is finished

Then the sleeve 22 moves further forward for its splines 22a to engage with the splines 18a of the third gear 18 which are rotating at the substantially same speed as that of the sleeve 22. This engagement brings the end of the shift operation. In this state, the projections 22h of the sleeve 22 contact with the engageable slanted surfaces 26b of the thrust pieces 26 as shown in FIG. 20. The thrust pieces 26 are restricted from being moved toward the hub 12 by the sleeve 22, which ensures to prevent unexpected occurrence in which the thrust pieces 26 move toward the fourth gear 20 in a state where the sleeve 22 engages with the third gear 18.

A shift operation to the fourth speed is similar to that to the third speed, although movements of the parts are symmetric to those in the shift operation to the third speed.

The shift device of the embodiment has the following advantages.

In the shift device of the embodiment, in order to obtain a certain synchronizing capacity, corresponding to friction torque, press force necessary for the sleeve 24 is smaller than that necessary for a shift device with a normal Borg-Warner type synchronizer. This means that the shift device of the embodiment can improve its synchronizing ability.

In addition, the hub 12 needs only the slanted surfaces 12g to 12j formed on the cut-off portions 12f thereof in the axial direction, and accordingly can be produced by using a sintering process, a sinter forging process, or the like. The reason being that the thrust pieces 26 are formed to have the first slanted surfaces 26k to 26n and the second slanted surfaces 26o to 26r at their four corners so that the thrust pieces 26 are engaged with the sleeve 22 during a synchronizing operation and they are disengaged from each other before the sleeve 22 is engaged with the speed gear after the synchronizing operation. Therefore, the shift device of the embodiment can decrease manufacturing costs of the hub 12.

While there have been particularly shown and described with reference to preferred embodiments thereof, it will be understood that various modifications may be made therein, and it is intended to cover in the appended claims all such modifications as fall within the true spirit and scope of the invention.

In the embodiment, the shift device with the synchronizer is mounted on the input shaft 10, but it may be mounted on an output shaft.

The slanted surfaces 12g to 12j of the hub 12 and the slanted surfaces 26k to 26r of the thrust pieces 26 may be formed in a tapered surface, a helical surface, and others.

The synchronizer ring 24 may have an oil groove on its inner friction surface in order to increase a friction coefficient of the friction surface, and may be made of material for improving synchronizing ability.

The shift device with the synchronizer may be applied to a multi-cone type synchronizer, which has several friction surfaces.

The shift device may be manually operated, or mechanically operated by an actuator.

The speed gear employs the third gear 18 and the fourth gear 20 in the embodiment, but may be other speed gear.

The entire contents of Japanese Patent Application No. 2006-049470 filed Feb. 27, 2006 are incorporated herein by reference.

What is claimed is:

1. A shift device with a synchronizer adapted for a transmission comprising:

a shaft for transmitting drive power;

a hub having a boss portion splined with the shaft, a ring portion located outwardly away from the boss portion and formed on an outer peripheral surface thereof with splines, and a flange portion connecting the boss portion and the ring portion, the ring portion and the flange portion being formed with a plurality of notch portions having four axial edges, and each of the four axial edges being provided with a slanted surface for changing rotational force to thrust;

a sleeve having splines on an inner peripheral surface thereof and having projections on a part of the splines of the sleeve, the sleeve being supported by and slidable along the splines of the hub;

a pair of speed gears arranged to sandwich the hub, the gears having splines, which are engageable with the splines of the sleeve, and a friction surface at a hub side;

a pair of synchronizer rings respectively arranged between the hub and the speed gears, the synchronizer rings each having a friction surface and chamfers on an outer circumference thereof, and the friction surfaces of each of the synchronizer rings being pressable on the friction surfaces of the speed gears; and thrust pieces that are movable in the notch portions of the hub in an axial direction of the shift device, wherein the thrust pieces are formed with first slanted surfaces pressable on the chamfers of the synchronizer rings and second slanted surfaces contactable with the slanted surfaces of the hub so that the thrust pieces are capable of changing rotational force due to friction torque generated between the friction surfaces to thrust, and wherein the thrust pieces engage and move together with the sleeve in the axial direction of the shift device when the sleeve is moved toward the gear to be engaged and the first slanted surfaces of the thrust pieces press the chamfers of the synchronizer ring, and the thrust pieces are disengaged from the sleeve when the friction torque becomes zero and the splines of the sleeve are engaged with the splines of the speed gear.

2. The shift device according to claim 1, wherein the synchronizer rings are provided with projections on outer peripheral surfaces thereof, and the thrust pieces have a substantially rectangular shape, when viewed from outside of the hub in a radial direction, and the thrust pieces have projections at four corners thereof, recess portions engageable with the projections of the sleeve and being formed on outer peripheral surfaces of the thrust pieces, and recesses formed at both end portions of the thrust pieces in the axial direction on inner peripheral surfaces of the thrust pieces for receiving the projections of the synchronizer rings, and wherein the inner peripheral surfaces of the thrust pieces contact the projections of the synchronizer ring when the first slanted surfaces press the chamfers of the synchronizer ring, and the recess portions of the thrust pieces are disengaged from the projections of the sleeve, receiving the projections of the synchronizer ring in the recess of the thrust pieces before the splines of the sleeve are engaged with the splines of the speed gear.

3. The shift device according to claim 2, wherein
the second slanted surfaces of the thrust pieces are in a contact-free relationship with the slanted surfaces of the hub when the sleeve is placed at a neutral position, and only the second slanted surfaces at the to-be-engaged-with speed gear side are contactable with the slanted surfaces of the hub when the sleeve is moved toward the to-be-engaged-with speed gear.

4. The shift device according to claim 3, wherein
the thrust pieces are configured to be pushed outwardly in the radial direction by a spring.

5. The shift device according to claim 4, wherein
the sleeve has projecting portions at central portions of a part of the splines thereof, and wherein
the projecting portions of the sleeve are contactable with the first slanted surfaces of the thrust pieces when the splines of the sleeve are engaged with the splines of the speed gear.

6. The shift device according to claim 1, wherein
the second slanted surfaces of the thrust pieces are in a contact-free relationship with the slanted surfaces of the hub when the sleeve is placed at a neutral position, and only the second slanted surfaces at the to-be-engaged-with speed gear side are contactable with the slanted surfaces of the hub when the sleeve is moved toward the to-be-engaged-with speed gear.

7. The shift device according to claim 6, wherein
the thrust pieces are configured to be pushed outwardly in the radial direction by a spring.

8. The shift device according to claim 7, wherein
the sleeve has projecting portions at central portions of a part of the splines thereof, and wherein
the projecting portions of the sleeve are contactable with the first slanted surfaces of the thrust pieces when the splines of the sleeve are engaged with the splines of the speed gear.

9. The shift device according to claim 1, wherein
the thrust pieces are configured to be pushed outwardly in the radial direction by a spring.

10. The shift device according to claim 9, wherein
the sleeve has projecting portions at central portions of a part of the splines thereof, and wherein
the projecting portions of the sleeve are contactable with the first slanted surfaces of the thrust pieces when the splines of the sleeve are engaged with the splines of the speed gear.

11. The shift device according to claim 1, wherein
the sleeve has projecting portions at central portions of a part of the splines thereof, and wherein
the projecting portions of the sleeve are contactable with the first slanted surfaces of the thrust pieces when the splines of the sleeve are engaged with the splines of the speed gear.

* * * * *